C. P. TATRO & G. DELIUS.
PROCESS OF PROTECTING WOOD IN SALT WATER.
APPLICATION FILED JAN. 25, 1909.
948,355.  Patented Feb. 8, 1910.
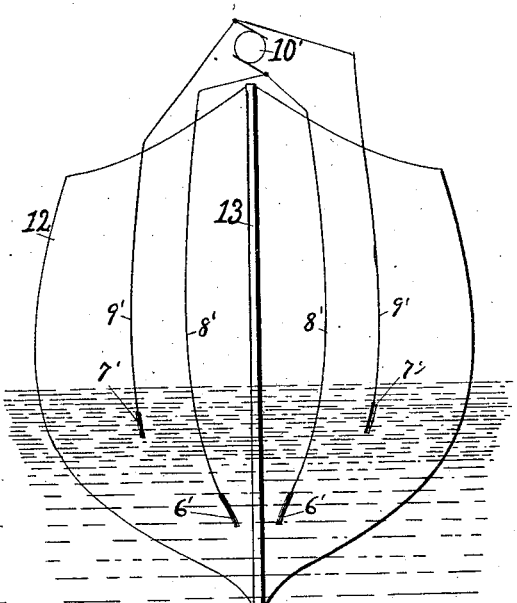
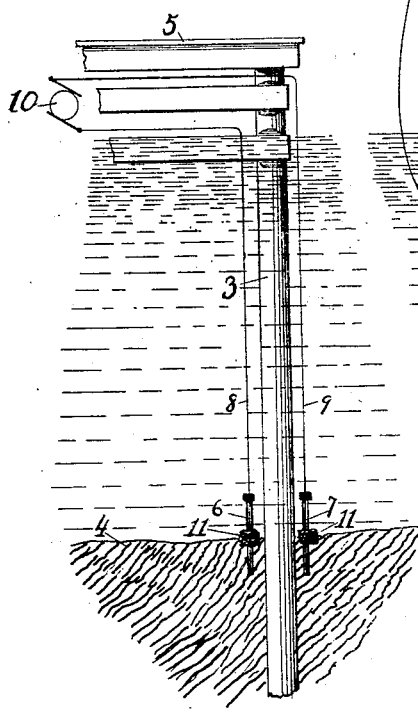
Witnesses
N. S. Waller
E. Gray.
Inventors.
Charles P. Tatro.
George Delius.
by W. R. Stevens
Attorney

UNITED STATES PATENT OFFICE.

CHARLES P. TATRO AND GEORGE DELIUS, OF SEATTLE, WASHINGTON.

PROCESS OF PROTECTING WOOD IN SALT WATER.

948,355.  Specification of Letters Patent.  Patented Feb. 8, 1910.

Application filed January 25, 1909. Serial No. 474,122.

*To all whom it may concern:*

Be it known that we, CHARLES P. TATRO and GEORGE DELIUS, citizens of the United States, residing at Seattle, in the county of King and State of Washington, have invented certain new and useful Improvements in Processes of Protecting Wood in Salt Water, of which the following is a specification.

It is well known that all woodwork, such as wharfing, piles, and the bottoms of seagoing vessels, located or moving in sea water, is liable to great injury from marine pests, such as teredo-worms, barnacles, etc., and the bottoms of seagoing ships are liable to become loaded with barnacles, forming so rough a surface that seaweeds and other trash becomes hung thereon, greatly injuring the sailing qualities of the ship.

Therefore the object of this invention is to provide an easy, expeditious and inexpensive means for removing these pests from ships' bottoms, and for protecting from such pests any non-metallic objects located or moving under sea water.

To this end our invention consists in the process for protecting wood in salt water hereinafter more fully described, and definitely stated in the claim.

Figure 1, represents a portion of a wharf supported on a pile protected according to this invention. Fig. 2, represents, somewhat diagrammatically, a front view of the hull of a wooden ship, protected according to this invention.

For protecting piles and other stationary fixtures under sea water, we locate near them and preferably at their opposite sides, and near the bottom or ocean bed, the anode and the cathode of an electric battery. These two poles of the battery must both be in contact with the sea water so that the circuit of the electric current must be completed through the water. This passage of electricity directly through the sea water, acts on the salts in solution and has the well known effect of liberating certain chemical elements, such as chlorin, iodin, bromin, etc., and these poisonous elements destroy all teredo-worms and barnacles within their reach. To protect seagoing ships we attach one or more anodes and one or more cathodes at both sides of the ship's prow; both under water, and both in open electric contact with the water; but both electrically insulated from the ship. Now, an electric current passed through these poles completes its circuit through the sea water close to the ship, liberating chlorin therein, and, as the ship sails along in service, the chlorin washes its sides throughout its length. This kills the barnacles and they consequently loose their hold and fall off, leaving the ship's bottom clean.

Numeral 3, Fig. 1, represents a portion of a pile driven into the mud bottom 4, and supporting a portion of a wharf 5. An anode 6, and a cathode 7, are connected by wires 8 and 9, respectively, with means, such for example as the generator 10, for supplying an electric current. The said anode and cathode may be held near the pile, but must be entirely insulated therefrom, and in or near the mud bottom of the sea, by any suitable contrivance, such for example, as blocks of concrete 11, cast around them and resting on the bottom 4. The anode 6, may be of carbon and the cathode 7, of iron, their object being to liberate free chlorin, bromin etc.; but the connections of these poles with their respective wires 8 and 9, must be made of electrolytically insoluble material, and the wires must be insulated from the water to prevent them from decomposition. To the ship's hull 12, an anode 6', and a cathode 7', are shown attached to each side of the prow 13. These anodes and cathodes are in open contact with the sea water and insulated from the material of the ship, while their wires 8', 9', are insulated from both the water and the ship, and they communicate with some means, such as the generator 10, for supplying an electric current. This device has no electric communication with the wood which is to be protected by it; and this process does not depend upon the direct action of electricity to destroy the pests which infest wood in salt water. It depends upon the chlorin, bromin, etc., which it liberates in the salt water by bringing the electric poles in direct contact with the water near the object to be protected.

Seawater being the breath of marine life, will, when impregnated with chlorin, destroy all such life. This process would protect metal bottomed ships also, from the same pests, but the chlorin would attack the metal and destroy it by corrosion.

In comparison with the work accomplished, the expense of generating the necessary electricity is a mere trifle.

The advantages in speed gained, and in ease of handling clean bottomed ships are so many that an attempt to rehearse them would be inadequate.

We claim.

The process of protecting wood in salt water from borers, barnacles and similar marine pests, which comprises locating in the water near to but not in contact with the object to be protected, a positive pole of insoluble material, and a negative pole, and passing an electric current through these poles, the circuit being completed through the water.

In testimony whereof we affix our signatures in presence of two witnesses.

CHARLES P. TATRO.
GEORGE DELIUS.

Witnesses:
L. B. STEDMAN,
ROSE E. MOHR.